(12) United States Patent
Sacripante et al.

(10) Patent No.: US 9,377,706 B2
(45) Date of Patent: Jun. 28, 2016

(54) SUSTAINABLE TONER AND OPTIMIZED PROCESS

(71) Applicant: Xerox Corporation, Norwalk, NY (US)

(72) Inventors: Guerino G Sacripante, Oakville (CA); Ke Zhou, Oakville (CA); Richard P N Veregin, Mississauga (CA); Edward G Zwartz, Mississauga (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 4 days.

(21) Appl. No.: 14/059,807

(22) Filed: Oct. 22, 2013

(65) Prior Publication Data

US 2015/0111145 A1    Apr. 23, 2015

(51) Int. Cl.
*G03G 9/00* (2006.01)
*G03G 9/087* (2006.01)
*C08G 63/16* (2006.01)
*G03G 9/08* (2006.01)
*G03G 9/093* (2006.01)

(52) U.S. Cl.
CPC ............ *G03G 9/08755* (2013.01); *C08G 63/16* (2013.01); *G03G 9/0802* (2013.01); *G03G 9/0806* (2013.01); *G03G 9/0827* (2013.01); *G03G 9/08797* (2013.01); *G03G 9/09371* (2013.01); *G03G 9/09392* (2013.01)

(58) Field of Classification Search
CPC .......... G03G 9/08755; G03G 9/08782; G03G 9/0819
USPC ....................... 430/109.1, 109.4, 110.2, 110.3
See application file for complete search history.

(56) References Cited

U.S. PATENT DOCUMENTS

| 2010/0239973 | A1* | 9/2010 | Sacripante | 430/109.4 |
| 2010/0330489 | A1* | 12/2010 | Inoue et al. | 430/108.4 |
| 2011/0129774 | A1* | 6/2011 | Farrugia et al. | 430/108.14 |
| 2012/0264041 | A1* | 10/2012 | Yamasaki et al. | 430/105 |

\* cited by examiner

*Primary Examiner* — Thorl Chea
(74) *Attorney, Agent, or Firm* — Marylou J. Lavoie, Esq. LLC

(57) ABSTRACT

The present disclosure describes a sustainable toner.

9 Claims, No Drawings

SUSTAINABLE TONER AND OPTIMIZED PROCESS

FIELD

Toner comprising sustainable material or reagents, such as bio-based materials; developers comprising said toner; devices comprising the toner and developers; imaging device components comprising the toner and developers; imaging devices comprising the developers; and so on, are described.

BACKGROUND

The vast majority of polymeric materials are based on fossil fuels, leading ultimately to increase in greenhouses gases and accumulation of non-degradable materials in the environment.

Recently, the USDA has proposed that all toners/ink have a bio-based content of at least 20%. Renewable or biodegradable reagents and materials, such as those which are plant-based/animal-based or which are readily biodegradable are being investigated as replacements for current toner reagents that may be produced in a simplified manner at a low cost.

A bio-based resin that can be used in toner made by a one-pot process that reduces complexity, materials and process time at lower cost, is described. A sustainable emulsion aggregation (EA) toner process that enables benchmark xerographic performance is described.

SUMMARY

The present disclosure describes a sustainable toner resin comprising a polyester derived from a bio-based rosin acid, a cyclic alkylene carbonate, an aromatic carboxylic acid and polyol, and comprising an optional wax and an optional colorant.

In embodiments, a toner resin is disclosed including the reaction product of a rosin acid, a cyclic alkylene carbonate, an aromatic dicarboxylic acid, and a polyol, where the aromatic carboxylic acid and the polyol include at least two functional groups, and where the toner resin comprises a sustainability content of at least about 70%.

In embodiments, a toner particle is disclosed including a reaction product of a rosin acid, a cyclic alkylene carbonate, an aromatic carboxylic acid, a polyol, an optional amorphous resin and an optional crystalline resin.

In embodiments, a process for making a sustainable polyester polymer in a single reactor comprises preparing a rosin diol from the reaction products between a rosin acid and a cyclic alkylene glycol; reacting said rosin diol with 2-ethyl-2-butyl 1,3 propanediol and terephthalic acid in said reactor to form said sustainable polyester polymer; and recovering said sustainable polyester polymer. That polymer then is used to make a sustainable toner.

DETAILED DESCRIPTION

I. Definitions

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein are the terms, "equivalent," "similar," "essentially," "substantially," "approximating" and "matching," or grammatical variations thereof, which have generally acceptable definitions or at the least, are understood to have the same meaning as, "about."

In the application, use of the singular includes the plural unless specifically stated otherwise. In the application, use of, "or," means, "and/or," unless stated otherwise. Furthermore, use of the term, "including," as well as other forms, such as, "includes," and, "included," is not limiting.

As used herein, "bio-based" means a commercial or industrial product (other than food or feed) that is composed, in whole or in substantial part (e.g., at least about 50%, at least about 60%, at least about 70%, at least about 80%, at least 90% by weight), of biological products or renewable agricultural materials (including plant, animal, and marine materials), forestry materials or other naturally occurring source. A biodegradable reagent is 100% bio-based. The reagent or product is one which is biodegradable, that is, the product can be degraded by natural processes, such as, by a microorganism, over a period of time comprising days, months or possibly a year or two, but not an excessive number of years, such as, not more than about 5 years. Bio-based resins which may be usable in toner are available commercially, for example, Entropy Resins, Gardena, Calif. and Chimar Hellas, S. A., Thessaloniki, G R; and bio-based reagents which might be usable in a toner resin are available, for example, from Sigma-Aldrich, St. Louis, Mo. For example, rosin acids may be used, such as, disproportionate rosin acid available from Arakawa Chemical, Osaka, JP or rosin-fumarate adduct available from Harima Chemicals. Duluth, Ga. Toner comprised in part of bio-based materials is available from, for example, Ink4Less, Tigard, Oreg. and PrintService GmbH, Eschweiber, Del.

As used herein, "sustainability," or grammatical variations thereof, refers to the amount, percentage, content or other measure of components in a toner that is bio-based and/or is reused from a prior and other purpose product and recycled for use in toner. For example, a resin that comprises 75% of a bio-based reagent, such as, a polyol or a polyacid/polyester used to make the resin is obtained from a plant source, that toner will have a sustainability content of 75%. Toners of interest comprise at least about 70/% sustainable content, at least about 80% sustainable content, at least about 90% sustainable content, at least about 95% or more. Generally, the calculation of the level of sustainability of a toner is made relative to the toner particle per se, without surface additives and without carrier. Hence, in the context of an emulsion/aggregation toner, the calculation would be based on the toner particle following any aggregation and coalescence. A sustainable resin or polymer comprises at least about 50% sustainable content, at least about 60%, at least about 70%, at least about 80%, at least about 90% or more sustainable content.

As used herein, a "rosin," or, "rosin product," is intended to encompass a rosin, a rosin acid, a rosin ester and so on, as well as a rosin derivative which is a rosin treated, for example, to comprise plural alcohol groups. As known in the art, rosin is a blend of at least eight monocarboxylic acids. Abietic acid can be a primary species, and the other seven acids are isomers thereof. Because of the composition of a rosin, often the synonym, "rosin acid," is used to describe various rosin-derived products. As known, rosin is not a polymer but essentially a varying blend of the eight species of carboxylic acids. A rosin product includes, as known in the art, chemically modified rosin, such as, partially or fully hydrogenated rosin acids, partially or fully dimerixed rosin acids, esterified rosin acids, functionalized rosin acids or combinations thereof. Rosin is available commercially in a number of forms, for example, as a rosin acid, as a rosin ester and so on. For example, rosin acids, rosin ester and dimerized rosin are available from Eastman Chemicals under the product lines, POLY-PALE™, DYMEREX™, STAYBELITE-E™, FORAL™ Ax-E, LEWISOL™ and PENTALYN™; Arizona Chemicals under the product lines, SYLVALITE™ and SYLVATAC™, and Arakawa-USA under the product lines, Pensel and Hypal.

II. Toner Particles

Toner particles of interest can comprise a polyester resin. A composition can comprise more than one form or sort of polymer, such as, two or more different polymers, such as, two or more different polyester polymers composed of different monomers. The polymer can be an alternating copolymer, a block copolymer, a graft copolymer, a branched copolymer, a crosslinked copolymer and so on.

The toner particle can include other optional reagents, such as, a surfactant, a wax, a shell and so on. The toner composition optionally can comprise inert particles, which can serve as toner particle carriers, which can comprise a resin taught herein. The inert particles can be modified, for example, to serve a particular function. Hence, the surface thereof can be derivatized or the particles can be manufactured for a desired purpose, for example, to carry a charge or to possess a magnetic field.

A. Components

1. Resin

Toner particles of the instant disclosure include a resin-forming monomer suitable for use in forming a particulate, optionally containing or carrying a colorant, of a toner for use in certain imaging devices. Any polyfunctional monomer may be used depending on the particular polymer desired in a toner particle. Hence, bifunctional reagents, trifunctional reagents and so on can be used. One or more reagents that comprise at least three functional groups may be incorporated into a polymer or into a branch to enable branching, further branching and/or crosslinking. Certain resins, for example, can be used for applications requiring low melting temperature. Formed particles can be mixed with other reagents, such as, a colorant, to form a developer.

One, two or more polymers may be used in forming a toner or toner particle. In embodiments, where two or more polymers are used, the polymers may be in any suitable ratio (e.g., weight ratio) such as, for instance, with two different polymers, from about 1% (first polymer)/90% (second polymer) to about 99% (first polymer)/1% (second polymer), in embodiments, from about 10% (first polymer)/90% (second polymer) to about 90% (first polymer)/10% (second polymer) and so on, as a design choice.

The polymer may be present in an amount of from about 65 to about 95% by weight, from about 75 to about 85% by weight of toner particles on a solids basis. A polymer may comprise from about 5 to about 70%, from about 7 to about 60%, from about 10 to about 50% by weight bio-based-resin. A toner may comprise from about 25% to about 90%, from about 35% to about 88%, from about 45% to about 85% bio-based material. Amounts outside of those ranges may be used as a design choice to achieve the desired sustainability content.

a. Toner Resins Comprising Rosin Acids

Rosin is generally derived from conifers and other plants, and comprises mixtures of organic acids, such as abietic acid and related compounds and isomers thereof, including for example, neoabietic acid, palustris acid, pimaric acid, levopimaric acid, isopimaric acid, dehydroabietic acid, or dihydroabietic acid, sandaracopimaric acid, and the like.

The rosin acids known as gum rosins are harvested, for example, from the periodic wounding of the gum tree and collecting the sap, followed by extraction processes and purification. The abietic acid and dedydroabietic acid content of a number of rosin acids is typically in excess of about 70 percent by weight of the mixture, such as for example, from about 75 to about 95, or from about 80 to about 90 percent by weight based on the total solids.

Other specific known sources of rosin acids are wood rosins, which are obtained by harvesting pine tree stumps after they have remained in the ground for about 10 years, so that the bark and sapwood decay, and extrude the resinous material extract thus resulting in the rosin acids as those disclosed herein, and where the various proportions of the individual acids may vary. For example, the major components of abietic acid and dedydroabietic amounts in the wood rosins are typically in excess of about 50 percent by weight, such as from about 55 to about 95, from about 70 to about 90 percent by weight of the mixture solids. The amount of abietic acid present in the wood rosin acids mixture can be controlled by known purification methods, such as distillation, and where the amount subsequent to purification of this acid is believed to be from about 70 to about 80 percent by weight of the rosin acid mixture. Similarly, the amount of dedydroabetic acid can vary including when this acid is subjected to purification by known distillation methods, and which amount is, for example, believed to be from about 65 to about 85 percent by weight.

The disclosed rosin acid mixtures can also be converted to a dehydroabietic acid content, such as from about 70 to about 85 percent by weight, by the dehydrogenation reaction of the mixture with a catalyst, such as a paladium activated carbon catalyst, to form disproportionated rosin acids, wherein the abietic acid content and other rosin acids are converted to the aromatic dehydroabietic acids, and where the dehydroabietic acid amount is from about 40 to about 90 percent by weight of the rosin acid mixture solids.

Additionally, rosin acid mixtures can be converted to hydrogenated rosin acids such that the conjugated unsaturation of abietic rosin acids and other rosin acid components can be removed through catalytic hydrogenation to overcome or minimize the shortcomings of oxidation and color degradation in the resulting rosin acids.

Examples of hydrogenated rosin acids include, but are not limited to dihydroabietic acids or dehydroabietic acids, and tetrahydroabietic acid.

Sources of known rosin acids are tall oil rosins, obtained by distillation of the byproduct of the known Kraft sulphate pulping process; rosin acid mixtures resulting from the pulping processes have a tendency to crystallize and usually contain from about 200 to about 600 parts per million (ppm) sulfur; distilled tall oil rosins resulting in rosin acids and esters thereof which can be reacted with diacids as illustrated herein, which oil rosins are cost competitive with gum rosin and wood rosin derivatives.

Rosin acids and mixtures thereof can be obtained from various sources, including Sigma-Aldrich, TCI America as abietic acid. Arakawa chemicals as Rosin KR-608™ or disproportionate KR-614™, where the dehydroabietic acid content is reported as being greater than about 80 percent by weight of total solids, rosin acids available from Pinova Inc., Eastman Chemicals. Hexion Chemicals, and Resinall Corporation, such as Resinall Rosin R807™; and hydrogenated rosin acid mixtures, such as Floral AX™, available from Pinova Incorporated.

In one aspect of the present disclosure, rosin acids are converted into difunctional monomers, such as rosin monoglycerates or a rosin diols, by reacting the rosin acid, such as abietic acid, with a glycerine carbonate and a catalyst, such as triethyl ammonium iodide, resulting in an abietic monogylcerate or an abietic diol.

The rosin diol products resulting from the reaction of rosin acids and glycerine carbonates can be monitored during the reaction by known methods, such as by the measurement of the acid values thereof. For example, the initial rosin acid or rosin acid mixture selected can have an acid value of about 135 to about 200 mg KOH/gram. During the reaction, the rosin acid is consumed and the acid value is reduced, thereby increasing the yield of product, to an acid value of less than about 1 mg KOH/gram of rosin (>99% yield), or about 0 mg KOH/gram (100% yield). The rosin diol product can be identified by both proton and carbon[13] Nuclear Magnetic Resonance as well as mass spectroscopy.

Examples of the glycerine carbonates, selected for the reaction with the rosin acids, are available from Huntsman Corporation as JEFFSOL® glycerine carbonates also identified by Huntsman Corporation as glycerine carbonate, glycerol carbonate, glyceryl carbonate, and 4-hydroxymethyl-1,3-dioxolan-2-one.

Examples of suitable polycondensation catalysts utilized for the preparation of the crystalline polyesters or the bio-based amorphous polyesters disclosed herein include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, zinc acetate, titanium isopropoxide, or mixtures thereof; and which catalysts are selected in amounts of, for example, from about 0.01 mole percent to about 5 mole percent, from about 0.1 to about 0.8 mole percent, from about 0.2 to about 0.6 mole percent, based on the starting diacid or diester used to generate the polyester resins.

Catalysts selected in the amounts illustrated herein include organo amines, such as ethyl amine, butyl amine, propyl amine, aryl amines, such as imidazole, 2-methyl imidazole, pyridine, dimethylamino pyridine, organo ammonium halides such as trimethyl ammonium chloride, triethyl ammonium chloride, tributyl ammonium chloride, trimethyl ammonium bromide, triethyl ammonium bromide, tributyl ammonium bromide, trimethyl ammonium iodide, triethyl ammonium iodide, tributyl ammonium iodide, tetraethyl ammonium chloride, tetraethyl ammonium bromide, tetraethyl ammonium iodide, tetrabutyl ammonium chloride, tetrabutyl ammonium bromide, tetrabutyl ammonium iodide, organo phosphines such as triphenylphosphine, organo phosphonium halides, tetraethyl phosphonium chloride, tetraethyl phosphonium bromide, tetraethyl phosphonium iodide, tetrabutyl phosphonium chloride, tetrabutyl phosphonium bromide, tetrabutyl phosphonium iodide, and the like.

a1. Processes

The process of the present disclosure comprises the reaction of a rosin acid (e.g., a disproportionate rosin acid), inclusive of known rosin acids as disclosed herein, with a non-toxic, economical, bio-based glycerine carbonate, such as, commercially available from Huntsman Corporation, and which reaction is accomplished in the presence of an optional catalyst. The basic reaction may be seen in the schematic below:

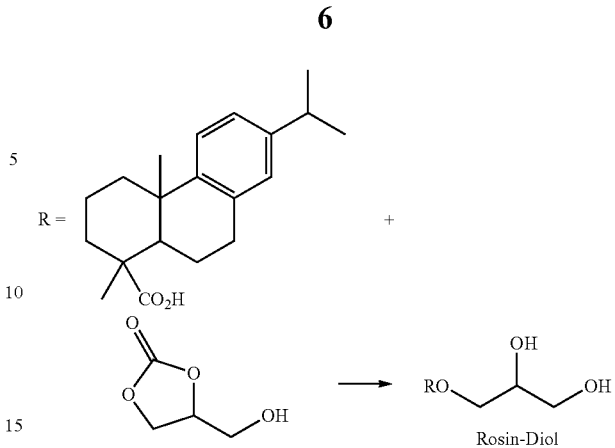

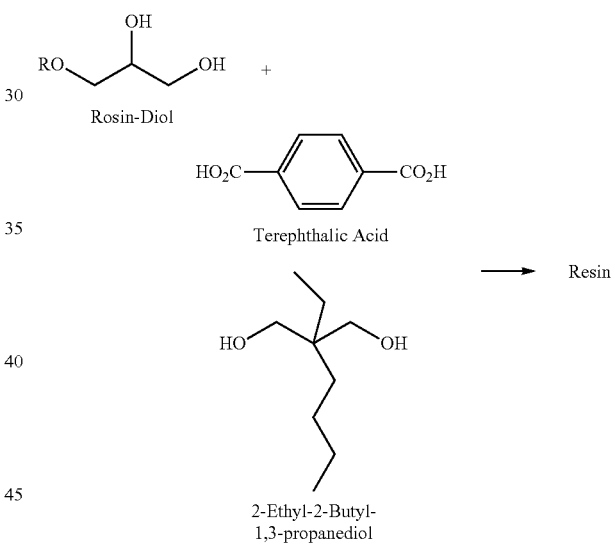

The corresponding rosin-diol is then polymerized with monomers comprising a carboxylic acid (e.g., terephthalic acid) and a polyol (e.g., butyl ethylene glycol) to achieve the bio-based resin. In embodiments, the corresponding rosin-diol is polymerized with the monomers, terephthalic acid and butyl ethylene glycol (2-butyl-2-ethyl-1,3-propanediol) as seen in the schematic below.

In the processes disclosed herein, there is prepared a rosin diol by the reaction of the components of a rosin acid, a bio-based glycerin carbonate, and an optional catalyst, which components are heated at various temperatures, such as for example, from about 110° C. to about 190° C., from about 120° C. to about 185° C., from about 120° C. to about 160° C., for a period of, for example, from about 1 hr to about 10 hr, from about 1 hr to about 9 hr, such that the resulting product has an acid value of equal to or less than about 1 mg KOH/gram (>99% yield), from about 0.1 to about 1, from 1 to about 1.9, from about 1 to about 1.5 mg KOH/gram, or 0 mg KOH/gram (100% yield).

Processes for the preparation of rosin diols can be accomplished by charging a reaction vessel with from about 0.95 to about 1.05 mole equivalent of rosin acid, from about 1.10 to 2.2 mole equivalents of glycerine carbonate, from about 0.001 to about 0.01 mole equivalent of a catalyst, such as tetraethyl or tetrabutyl ammonium iodide. The resulting mixture then is heated with stirring to a temperature of from about 120° C. to about 185° C. for a period of from about 1 hr to about 9 hr. The reaction is monitored until the acid value of the reaction mixture is less than about 1 mg KOH/grams, such as, from about 1 to about zero. Although a slight excess of from about 0.05 to about 0.15 mole equivalent of glycerine carbonate can be selected for the reaction, a larger excess of from about 0.16 to about 2 mole equivalents of glycerine carbonate can be utilized. The excess glycerin carbonate can serve as a branching agent during the polymerization with the diacid to produce the amorphous bio-based polyester resin.

However, in some instances, a minor amount of a product, such as a bis-rosin glycerate, forms from the reactions disclosed herein, especially in some instances when basic catalysts are utilized. For example, when there is selected a catalyst of 2-methyl imidazole or dimethyl amino pyridine, a bis-rosin glycerate may result as the major product.

The formation of the disclosed bis-rosin glycerate is not necessarily avoided as it can also polymerize through transesterification reactions with a diacid and a diol in the presence of a polycondensation catalyst at temperatures of from about 220° C. to about 260° C., to result in the bio-based amorphous polyester resin. Furthermore, when an excess amount of glycerine carbonate is selected, it can subsequently react with the diacid/diol to form the bio-based amorphous polyester, and where the excess glycerol and/or glycerine content are a source of branching.

Subsequently, the prepared rosin diols, of from about 0.1 to about 0.4 mole percent, are reacted with a diol, such as, 2-ethyl-2-butyl-1,3-propanediol, of from about 0.1 to about 0.3 mole, and a suitable acid, such as, a terephthalic acid, of from about 0.48 to about 0.52 mole percent to generate the desired bio-based amorphous polyester resins. The bio-based amorphous polyester resins generated from glycerine carbonate monomers, which monomers are considered bio-based because they are derived from natural sources of, for example, rosins obtained from tree sap and glycerine obtained mostly from vegetable oils and suitable petrochemicals such as those derived from isophthalic acid, terephthalic acid, and the like.

The rosin diols resulting in accordance with the processes disclosed herein are reacted with a number of known diacids, such as dicarboxylic acids, as represented by the following formulas/structures, HOOC—R—COOH, where R is aryl or comprises an aryl group or heteroaryl group.

Specific examples of dicarboxylic acids that can be reacted with the rosin diols and organic diols are folic acid, isophthalic acid, phthalic acid, terephthalic acid, and the like. The diacid is selected in an amount of, for example, from about 40 to about 60 mole %, from about 45 to about 55 mole % of the polyester resin solids.

Specific examples of optional organic diols that can be reacted with the rosin diols and diacids are alkylene glycols like ethylene glycol, 1,2-propylene glycol, 1,3-propane diol, butylene glycol, ethyl butylene glycol, pentylene glycol, 1,6-hexane diol, 2-ethyl-2-butyl-1,3-propanediol, 1,7-heptanediol, 1,9-nonanediol, 1,10-decanediol, or 1,4-cyclohexane diol; 1,4-cyclohexanedimethanol, and mixtures thereof. The diols are, for example, selected in an amount of from about 0 to about 25, from about 5 to about 15 mole % of the polyester resin solids.

Branching agents, such as multivalent polyacid or polyol, can also be utilized to crosslink or to obtain the branched amorphous bio-based polyesters. Examples of branching agents are 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower, with from 1 to about 6 carbon atoms, alkyl esters; multivalent polyols such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, glycerine carbonate, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5, from about 1 to about 3 mole percent of the polyester resin solids.

The bio content of the obtained amorphous polyester resins can be determined by a number of known methods, for example, based on the amount of the rosin acid and glycerine carbonate present in the reaction mixture. Biocontent amounts are, for example, from about 45 to about 75, from about 50 to about 70, from about 55 to about 65, from about 55 to about 62% by weight of the bio-based amorphous polyester resin.

The bio-based amorphous polyester resins, linear or branched, obtained by the processes disclosed herein, can possess various onset glass transition temperatures (Tg) of, for example, from about 40° C. to about 80° C., from about 50° C. to about 70° C. as measured by differential scanning calorimetry (DSC). The linear and branched amorphous polyester resins, in embodiments, possess, for example, a number average molecular weight ($M_n$), as measured by gel permeation chromatography (GPC) of from about 10,000 to about 500,000, from about 5,000 to about 250,000), and a weight average molecular weight ($M_w$) of, for example, from about 20,000 to about 600,000, from about 7,000 to about 300,000, as determined by GPC; and a molecular weight distribution ($M_w/M_n$) of, for example, from about 1.5 to about 6, from about 2 to about 4.

c. Polyester Resins

Suitable polyester resins, which may be added to a toner, include, for example, those which are sulfonated, non-sulfonated, crystalline, amorphous, combinations thereof and the like. The polyester resins may be linear, branched, crosslinked, combinations thereof and the like. Polyester resins may include those described, for example, in U.S. Pat. Nos. 6,593,049; 6,830,860; 7,754,406; 7,781,138; 7,749,672; and 6,756,176, the disclosure of each of which hereby is incorporated by reference in entirety.

When a mixture is used, such as, amorphous and crystalline polyester resins, the ratio of crystalline polyester resin to amorphous polyester resin may be in the range from about 1:99 to about 30:70; from about 5:95 to about 25:75; from about 5:95 to about 15:95.

A polyester resin may be obtained synthetically, for example, in an esterification reaction involving a polyfunctional reagent comprising carboxylic acid groups and another polyfunctional reagent comprising alcohol groups. In embodiments, the alcohol reagent (a polyol) comprises one or more hydroxyl groups, in embodiments, two or more hydroxyl groups or three or more hydroxyl groups. In embodiments, the acid (a polyacid or polyester) comprises two or more carboxylic acid groups, in embodiments, three or more carboxylic acid groups. Reagents comprising three or more functional groups enable, promote or enable and promote polymer branching and crosslinking.

Examples of polyacids or polyesters that may be used for preparing an amorphous polyester resin include bio-based acids, such as, rosin acids, terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The polyacid or polyester reagent may be present, for example, in an amount from about 40 to about 60 mole percent of the resin, from about 42 to about 52 mole percent of the resin, from about 45 to about 50 mole percent of the resin, and optionally a second polyacid can be used in an amount from about 0.1 to about 10 mole percent of the resin.

Examples of polyols which may be used in generating an amorphous polyester resin include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, 2-ethyl-2-butyl-1,3-propanediol, heptanediol, dodecanediol, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, and combinations thereof. The amount of polyol may vary, and may be present, for example, in an amount from about 40 to about 60 mole percent of the resin, from about 42 to about 55 mole percent, from about 45 to about 53 mole percent of the resin, and a second polyol may be used in an amount from about 0.1 to about 10 mole percent, in embodiments, from about 1 to about 4 mole percent of the resin.

Polycondensation catalysts may be used in forming the amorphous (or crystalline) polyester resin, and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide, or combinations thereof. Such catalysts may be used in amounts of, for example, from about 0.01 mole percent to about 5 mole percent based on the starting polyacid or polyester reagent(s) used to generate the polyester resin.

For forming a crystalline polyester resin, suitable polyols include aliphatic polyols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like, including their structural isomers. The aliphatic polyol may be, for example, selected in an amount from about 40 to about 60 mole percent from about 42 to about 55 mole percent, from about 45 to about 53 mole percent and a second polyol may be used in an amount from about 0.1 to about 10 mole percent, in embodiments from about 1 to about 4 mole percent of the resin.

Examples of polyacid or polyester reagents for preparing a crystalline resin include bio-based reagents, such as, rosin acids, oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid (sometimes referred to herein, in embodiments, as cyclohexanedioic acid), malonic acid and mesaconic acid, a polyester or anhydride thereof, and an alkali sulfo-organic polyacid, such as, the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid N,N-bis(2-hydroxyethyl)-2-amino ethane sulfonate, or mixtures thereof. The polyacid may be selected in an amount of, for example, in embodiments, from about 40 to about 60 mole percent, from about 42 to about 52 mole percent, from about 45 to about 50 mole percent, and optionally, a second polyacid may be selected in an amount from about 0.1 to about to mole percent of the resin.

Specific crystalline resins include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate) and copoly(2,2-dimethylpropane-1,3-diol-decanoate)-copoly(ethylene-adipate).

Suitable crystalline resins include those disclosed in U.S. Pub. No. 2006/0222991, the disclosure of which is hereby incorporated by reference in entirety.

In embodiments, a suitable crystalline resin may include a resin formed of ethylene glycol and a mixture of dodecanedioic acid and fumaric acid co-monomers.

The crystalline resin may be present, for example, in an amount from about 1 to about 85% by weight of the toner components, from about 2 to about 50% by weight, from about 5 to about 15% by weight of the toner components. The crystalline resin may possess various melting points of, for example, from about 30° C. to about 120° C., from about 50° C. to about 90° C., from about 60° C. to about 80° C. The crystalline resin may have an $M_n$, as measured by GPC of for example, from about 1,000 to about 50,000 grams/mole, from about 2,000 to about 25,000 g/mole, and an $M_w$ of, for example, from about 2,000 to about 100,000 g/m, from about 3,000 to about 80,000 g/mole, as determined by GPC. The $M_w/M_n$ of the crystalline resin may be, for example, from about 2 to about 6, from about 3 to about 5.

In embodiments, to increase the gloss of the resulting toner (e.g., by about 5 gloss units), changing the ratio of at least two amorphous resins comprising the toner may be carried out.

d. Catalyst

Condensation catalysts which may be used in the polyester reaction include tetraalkyl titanates; dialkyltin oxides, such as, dibutyltin oxide; tetraalkyltins, such as, dibutyltin dilaurate; dibutyltin diacetate; dibutyltin oxide; dialkyltin oxide hydroxides, such as, butyltin oxide hydroxide; aluminum alkoxides, alkyl zinc, dialkyl zinc, zinc oxide, stannous oxide, stannous chloride, butylstannoic acid or combinations thereof.

Such catalysts may be used in amounts of, for example, from about 0.01 mole percent to about 5 mole % based on the amount of starting polyacid, polyol or polyester reagent in the reaction mixture.

e. Branching

Branching agents may be used, and include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2, 5-hexanetricarboxylic acid, 1,3-dicarboxyl-2-methyl-2-methylene-carboxylpropane, tetra(methylene-carboxyl) methane, 1,2,7,8-octanetetracarboxylic acid, acid anhydrides thereof, lower alkyl esters thereof and so on. The branching agent may be used in an amount from about 0.01 to about 10 mole percent of the resin, from about 0.05 to about 8 mole percent, from about 0.1 to about 5 mole percent of the resin.

Generally, as known in the art, the polyacid/polyester and polyols reagents are mixed together, optionally with a catalyst, and incubated at an elevated temperature, such as, from about 180° C. or more, from about 190° C. or more, from about 200° C. or more, and so on, which can be conducted anaerobically, to enable esterification to occur until equilibrium, which generally yields water or an alcohol, such as, methanol, arising from forming the ester bonds in esterification reactions. The reaction may be conducted under vacuum to promote polymerization. The product is collected by practicing known methods, and may be dried, again, practicing known methods to yield particulates.

2. Colorants

Suitable colorants include those comprising carbon black, such as, REGAL 330® and Nipex 35; magnetites, such as, Mobay magnetites, MO8029™ and MO8060™; Columbian magnetites, MAPICO® BLACK; surface-treated magnetites; Pfizer magnetites, CB4799™, CB5300™, CB5600™ and MCX6369™; Bayer magnetites, BAYFERROX 8600™ and 8610™; Northern Pigments magnetites, NP604™ and NP-608™; Magnox magnetites, TMB-100™ or TMB104™; and the like.

Colored pigments, such as cyan, magenta, orange, violet, brown, blue or mixtures thereof can be used, where the colored pigments exhibit a spectral response reflectance of R=0.20 or lower over the full spectral range, from about 400 to about 700 nm. The additional pigment or pigments may be used as water-based pigment dispersions.

Examples of pigments include SUNSPERSE 6000, FLEXIVERSE and AQUATONE, water-based pigment dispersions from SUN Chemicals; HELIOGEN BLUE L6900™, D6840™, D7080™, D7020™, PYLAM OIL BLUE™, and PIGMENT BLUE I™ available from Paul Uhlich & Company, Inc.; PIGMENT VIOLET I™ available from Dominion Color Corporation, Ltd., and the like.

Other known colorants may be used, such as, Levanyl Black ASF (Miles, Bayer) and Sunsperse Carbon Black LHD 9303 (Sun Chemicals), and colored dyes, such as, Neopen Blue (BASF), Sudan Blue OS (BASF), PV Fast Blue B2G 01 (American Hoechst), Sunsperse Blue BHD 6000 (Sun Chemicals), Irgalite Blue BCA (CibaGeigy), Paliogen Blue 6470 (BASF), Sudan Orange G (Aldrich), Sudan Orange 220 (BASF), Paliogen Orange 3040 (BASF), Ortho Orange OR 2673 (Paul Uhlich) combinations of the foregoing and the like.

The colorant, when present, may be employed in an amount greater than 6%, such as, ranging from about 7% to about 17% by weight of the toner particles on a solids basis, from about 8% to about 15% by weight, from about 9% to about 13% by weight.

In embodiments, portions of the pigment loading, for example furnace carbon black (e.g., but not limited to, Nipex 35), may be replaced by two or more second colorants or pigments that are not blacks. In certain embodiments, the pigment loading is increased by at least about 10%, by at least about 20%, by at least about 30% or more by replacing portions of the black with a set of color pigments that exhibit a spectral response that is substantially the same as carbon black and where such color pigments may be selected based on spectral response curve data.

In embodiments, more than two colorants may be present in a toner particle. For example, three colorants may be present in a toner particle, such as, a first colorant of pigment blue, may be present in an amount ranging from about 1% to about 10% by weight of the toner particle on a solids basis, from about 2% to about 8% by weight, from about 3% to about 4.2% by weight; with a second colorant of pigment orange that may be present in an amount ranging from about 1% to about 10% by weight of the toner particle on a solids basis, from about 2% to about 8% by weight, from about 3% to about 4.5% by weight; with a third colorant of pigment violet that may be present in an amount ranging from about 0% to about 0.81% by weight of the toner particle on a solids basis, from about 0.1% to about 1.0% by weight, from about 0.5% to about 0.7% by weight and so on.

3. Optional Components a. Surfactants

Toner compositions, colorants and so on may be in dispersions including surfactants. Emulsion aggregation methods where the polymer and other components of the toner are in combination may employ one or more surfactants to form an emulsion.

One, two or more surfactants may be used. The surfactants may be selected from ionic surfactants and nonionic surfactants, or combinations thereof. Anionic surfactants and cationic surfactants are encompassed by the term, "ionic surfactants."

The surfactant or the total amount of surfactants may be used in an amount of from about 0.01% to about 5% by weight of the toner forming composition.

Examples of nonionic surfactants include, for example, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether and dialkylphenoxy poly(ethyleneoxy) ethanol, for example, available from Rhone-Poulenc as IGEPAL CA-210™, IGEPAL CA520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC® PR/F, in embodiments, SYNPERONIC® PR/F 108; and a DOWFAX, available from The Dow Chemical Corp.

Anionic surfactants include sulfates and sulfonates, such as, sodium dodecylsulfate (SDS), sodium dodecylbenzene sulfonate, sodium dodecylnaphthalene sulfate and so on; dialkyl benzenealkyl sulfates; acids, such as, palmitic acid, and NEOGEN or NEOGEN SC obtained from Daiichi Kogyo Seiyaku, and so on, combinations thereof and the like. Other suitable anionic surfactants include, in embodiments, alkyldiphenyloxide disulfonates or TAYCA POWER BN2060 from Tayca Corporation (Japan), which is a branched sodium dodecyl benzene sulfonate. Combinations of those surfactants and any of the foregoing nonionic surfactants may be used in embodiments.

Examples of cationic surfactants include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromides, halide salts of quarternized polyoxyethylalkylamines, dodecylbenzyl triethyl ammonium chlorides, MIRAPOL® and ALKAQUAT® available from Alkaril Chemical Company, SANISOL® (benzalkonium chloride) available from Kao Chemicals and the like, and mixtures thereof, including, for example, a nonionic surfactant as known in the art or provided hereinabove.

b. Waxes

The toners of the instant disclosure, optionally, may contain a wax, which can be either a single type of wax or a mixture of two or more different types of waxes (hereinafter identified as, "a wax"). A wax can be added to a toner formulation or to a developer formulation, for example, to improve particular toner properties, such as, toner particle shape, charging, fusing characteristics, gloss, stripping, offset properties and the like. Alternatively, a combination of waxes can be added to provide multiple properties to a toner or a developer composition. A wax may be included as, for example, a fuser roll release agent.

The wax may be combined with the resin-forming composition for forming toner particles. When included, the wax may be present in an amount of, for example, from about 1 weight percent to about 25 weight percent of the toner particles, from about 5 weight percent to about 20 weight percent of the toner particles.

Waxes that may be selected include waxes having, for example, a weight average molecular weight of from about 500 to about 20,000, from about 1,000 to about 10,000. Waxes that may be used include, for example, polyolefins, such as, polyethylene, polypropylene and polybutene waxes, such as, those that are commercially available, for example, POLYWAX™ polyethylene waxes from Baker Petrolite, wax emulsions available from Michaelman, Inc. or Daniels Products Co., EPOLENE N15™ which is commercially available from Eastman Chemical Products, Inc., VISCOL 550P™, a low weight average molecular weight polypropylene available from Sanyo Kasei K.K.; plant-based waxes, such as carnauba wax, rice wax, candelilla wax, sumac wax and jojoba oil; animal-based waxes, such as beeswax; mineralbased waxes and petroleum-based waxes, such as montan wax, ozokerite, ceresin wax, paraffin wax, microcrystalline wax and FischerTropsch waxes; ester waxes obtained from higher fatty acids and higher alcohols, such as stearyl stearate and behenyl behenate; ester waxes obtained from higher fatty acids and monovalent or multivalent lower alcohols, such as butyl stearate, propyl oleate, glyceride monostearate, glyceride distearate and pentaerythritol tetrabehenate; ester waxes obtained from higher fatty acids and multivalent alcohol multimers, such as diethyleneglycol monostearate, dipropyleneglycol distearate, diglyceryl distearate and triglyceryl tetrasteatrate; sorbitan higher fatty acid ester waxes, such as sorbitan monostearate; cholesterol higher fatty acid ester waxes, such as, cholesteryl stearate, and so on.

Examples of functionalized waxes that may be used include, for example, amines and amides, for example, AQUA SUPERSLIP 6550™ and SUPERSLIP 6530™ available from Micro Powder Inc.; fluorinated waxes, for example, POLYFLUO 190™, POLYFLUO 200™, POLYSILK 19™ and POLYSILK 14™ available from Micro Powder Inc.; mixed fluorinated amide waxes, for example, MICROSPERSION 19™ also available from Micro Powder Inc.; imides, esters, quaternary amines, carboxylic acids, acrylic polymer emulsions, for example, JONCRYL 74™, 89™, 130™, 537™ and 538™ available from SC Johnson Wax; and chlorinated polypropylenes and polyethylenes available from Allied Chemical, Petrolite Corp. and SC Johnson. Mixtures and combinations of the foregoing waxes also may be used in embodiments.

c. Aggregating Factor

An aggregating factor may be used and may be an inorganic cationic coagulant, such as, for example, polyaluminum chloride (PAC), polyaluminum sulfosilicate (PASS), aluminum sulfate, zinc sulfate, magnesium sulfate, chlorides of magnesium, calcium, zinc, beryllium, aluminum, sodium, other metal halides including monovalent and divalent halides.

The aggregating factor may be present in an emulsion in an amount of from, for example, from about 0.01 to about 10 weight percent, from about 0.05 to about 5 weight percent based on the total solids in the toner.

The aggregating factor may also contain minor amounts of other components, for example, nitric acid.

A sequestering agent or chelating agent may be introduced during or after aggregation is complete to adjust pH and/or to sequester or to extract a metal complexing ion, such as, aluminum, from the aggregation process. Thus, the sequestering, chelating or complexing agent used after aggregation is complete may comprise a complexing component, such as, ethylenediaminetetraacetic acid (EDTA), gluconal, hydroxyl-2, 2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; salts of EDTA, such as, alkali metal salts of EDTA, tartaric acid, gluconic acid, oxalic acid, polyacrylates, sugar acrylates, citric acid, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1, 1-diphosphonic acid, aminotrimethylenephosphonic acid, diethylene triaminepentamethylene phosphonic acid, ethylenediamine tetramethylene phosphonic acid, and mixtures thereof.

d. Surface Additives

In embodiments, the toner particles may be mixed with one or more of silicon dioxide or silica ($SiO_2$), titania or titanium dioxide ($TiO_2$) and/or cerium oxide. Silica may be a first silica and a second silica. The first silica may have an average primary particle size, measured in diameter, in the range of, for example, from about 5 nm to about 50 nm, from about 5 nm to about 25 nm, from about 20 nm to about 40 nm. The second silica may have an average primary particle size, measured in diameter, in the range of, for example, from about 100 nm to about 200 nm, from about 100 nm to about 150 nm, from about 125 nm to about 145 nm. The second silica may have a larger average size (diameter) than the first silica. The titania may have an average primary particle size in the range of, for example, about 5 nm to about 50 nm, from about 5 nm to about 20 nm, from about 10 nm to about 50 nm. The cerium oxide may have an average primary particle size in the range of, for example, about 5 nm to about 50 am, from about 5 nm to about 20 nm, from about 10 nm to about 50 nm.

Examples of such additives include those disclosed in U.S. Pat. Nos. 3,590,000; 3,720,617; 3,655,374; and 3,983,045, the disclosure of each of which hereby is incorporated by reference in entirety.

Zinc stearate also may be used as an external additive. Calcium stearate and magnesium stearate may provide similar functions. Zinc stearate may have an average primary particle size in the range of, for example, from about 500 nm to about 700 nm, from about 500 nm to about 600 nm, from about 550 nm to about 650 nm.

Surface additives may be used in an amount of from about 0.1 to about 10 weight percent, or from about 0.5 to about 7 weight percent of the toner.

Other surface additives include lubricants, such as, a metal salt of a fatty acid (e.g., zinc or calcium stearate) or long chain alcohols, such as, UNILIN 700 available from Baker Petrolite and AEROSIL R972® available from Degussa. The coated silicas of U.S. Pat. Nos. 6,190,815 and 6,004,714, the disclosures of each of which hereby are incorporated by reference in entirety, also can be present.

Silica, for example, may enhance toner flow, tribo control, admix control, improved development and transfer stability and higher toner blocking temperature. Zinc, calcium or magnesium stearate also may provide developer conductivity, tribo enhancement, higher toner charge and charge stability. The external surface additives may be used with or without a coating or shell.

The gloss of a toner may be influenced by the amount of retained metal ion, such as, $Al^{3+}$, in a particle. The amount of retained metal ion may be adjusted further by the addition of a chelator, such as, EDTA. In embodiments, the amount of retained catalyst, for example, $Al^{3+}$, in toner particles of the present disclosure may be from about 0.1 pph to about 1 pph, from about 0.25 pph to about 0.8 pph. The gloss level of a toner of the instant disclosure may have a gloss, as measured by Gardner gloss units (gu), of from about 20 gu to about 100 gu, from about 50 gu to about 95 gu, from about 60 gu to about 90 gu.

B. Toner Particle Preparation

1. Method a. Particle Formation

The toner particles may be prepared by any method within the purview of one skilled in the art, for example, any of the phase inversion emulsification (PIE) or emulsion/aggregation (EA) methods may be used with a polyester resin and the optional first and optional second colorants as taught herein. The phase inversion emulsification method is a method in which a resin to be dispersed is dissolved in a hydrophobic organic solvent that is able to dissolve the resin, a base is then added thereto in an organic continuous phase (O phase) to neutralize the solution, and then an aqueous medium (W phase) is added to the resultant. In this manner, the resin is converted from W/O to O/W (so-called phase inversion) and becomes a discontinuous phase, whereby the resin is dispersed in the shape of particles (see, e.g., U.S. Pub. No. 2013/0196259, herein incorporated by reference in entirety).

Any suitable method of preparing toner particles may be used, including chemical processes, such as, suspension and encapsulation processes disclosed, for example, in U.S. Pat. Nos. 5,290,654 and 5,302,486, the disclosure of each of which hereby is incorporated by reference in entirety; by conventional granulation methods, such as, jet milling; pelletizing slabs of material, other mechanical processes; any process for producing nanoparticles or microparticles; and so on.

In embodiments relating to an emulsification/aggregation process, a plurality of resins, one or more of which is a sustainable resin, such as one comprising a bio-based polyester/polyacid of interest may be dissolved in a solvent, and may be mixed into an emulsion medium, for example, water, such as, deionized water, optionally containing a stabilizer, and optionally a surfactant. Examples of suitable stabilizers include water-soluble alkali metal hydroxides, such as, sodium hydroxide, potassium hydroxide, lithium hydroxide, beryllium hydroxide, magnesium hydroxide, calcium hydroxide or barium hydroxide; ammonium hydroxide; alkali metal carbonates, such as, sodium bicarbonate, lithium bicarbonate, potassium bicarbonate, lithium carbonate, potassium carbonate, sodium carbonate, beryllium carbonate, magnesium carbonate, calcium carbonate, barium carbonate or cesium carbonate; or mixtures thereof. When a stabilizer is used, the stabilizer may be present in amounts of from about 0.1% to about 5%, from about 0.5% to about 3% by weight of the resin.

Optionally, a surfactant may be added to the aqueous emulsion medium, for example, to afford additional stabilization to the resin or to enhance emulsification of the resin. Suitable surfactants include anionic, cationic and nonionic surfactants as taught herein.

Following emulsification, toner compositions may be prepared by aggregating a mixture of a resin, the first and optional second colorants of interest, an optional wax and any other desired additives in an emulsion, optionally, with surfactants as described above, and then optionally coalescing the aggregate mixture. A mixture may be prepared by adding an optional wax or other materials, which may also be optionally in a dispersion, including a surfactant, to the emulsion comprising a resin-forming material and the first and second colorants, which may be a mixture of two or more emulsions containing the requisite reagents. The pH of the resulting mixture may be adjusted with an acid, such as, for example, acetic acid, nitric acid or the like. In embodiments, the pH of the mixture may be adjusted to from about 2 to about 4.5.

Additionally, in embodiments, the mixture may be homogenized. If the mixture is homogenized, mixing may be at from about 600 to about 4,000 rpm. Homogenization may be by any suitable means, including, for example, an IKA ULTRA TURRAX T50 probe homogenizer.

b. Aggregation

Following preparation of the above mixture, often, it is desirable to form larger particles or aggregates, often sized in micrometers, of the smaller particles from the initial polymerization reaction, often sized in nanometers. An aggregating factor may be added to the mixture. Suitable aggregating factors include, for example, aqueous solutions of a divalent cation, a multivalent cation or a compound comprising same.

The aggregating factor may be added to the mixture at a temperature that is below the glass transition temperature ($T_g$) of the resin or of a polymer.

The aggregating factor may be added to the mixture components to form a toner in an amount of, for example, from about 0.1 part per hundred (pph) to about 1 pph, in embodiments, from about 0.25 pph to about 0.75 pph, in embodiments, about 0.5 pph of the reaction mixture.

To control aggregation of the particles, the aggregating factor may be metered into the mixture over time. For example, the factor may be added incrementally into the mixture over a period of from about 5 to about 240 minutes, in embodiments, from about 30 to about 200 minutes.

Addition of the aggregating factor also may be done while the mixture is maintained under stirred conditions, in embodiments, from about 50 rpm to about 1,000 rpm, in embodiments, from about 100 rpm to about 500 rpm; and at a temperature that is below the $T_g$ of the resin or polymer, from about 30° C. to about 90° C., from about 35° C. to about 70° C. The growth and shaping of the particles following addition of the aggregation factor may be accomplished under any suitable condition(s).

The particles may be permitted to aggregate until a predetermined desired particle size is obtained. Particle size may be monitored during the growth process. For example, samples may be taken during the growth process and analyzed, for example, with a COULTER COUNTER, for average particle size. The aggregation thus may proceed by maintaining the mixture, for example, at elevated temperature, or slowly raising the temperature, for example, from about 40° C. to about 100° C., and holding the mixture at that temperature for from about 0.5 hours to about 6 hours, in embodiments, from about hour 1 to about 5 hours, while maintaining stirring, to provide the desired aggregated particles. Once the predetermined desired panicle size is attained, the growth process is halted.

Once the desired final size of the toner particles or aggregates is achieved, the pH of the mixture may be adjusted with base to a value of from about 6 to about 10, in embodiments, from about 6.2 to about 7. The adjustment of pH may be used to freeze, that is, to stop, toner particle growth. The base used to stop toner particle growth may be, for example, an alkali metal hydroxide, such as, for example, sodium hydroxide, potassium hydroxide, ammonium hydroxide, combinations thereof and the like. In embodiments, EDTA may be added to assist adjusting the pH to the desired value. The base may be added in amounts from about 2 to about 25% by weight of the mixture, in embodiments, from about 4 to about 10% by weight of the mixture.

The characteristics of the toner particles may be determined by any suitable technique and apparatus. Volume average particle diameter and geometric standard deviation may be measured using an instrument, such as, a Beckman Coulter MULTISIZER 3, operated in accordance with the instructions of the manufacturer.

The growth and shaping may be conducted under conditions in which aggregation occurs separate from coalescence. For separate aggregation and coalescence stages, the aggregation process may be conducted under shearing conditions at an elevated temperature, for example, of from about 40° C. to about 90° C. in embodiments, from about 45° C. to about 80° C., which may be below the $T_g$ of the resin or a polymer.

In embodiments, the aggregate particles may be of a size of less than about 3 μm, in embodiments from about 2 μm to about 6 μm, in embodiments from about 3 μm to about 5 μm.

In embodiments, after aggregation, but prior to coalescence, a resin coating may be applied to the aggregated particles to form a shell thereover. Any resin described herein or as known in the art may be used as the shell. In embodiments, a sustainable polyester amorphous resin latex as described herein, such as one comprising a bio-based polyester/polyacid may be included in the shell. In embodiments, a polyester amorphous resin latex described herein, such as one comprising a bio-based polyacid/polyester may be combined with a different resin, and then added to the particles as a resin coating to form a shell.

A shell resin may be applied to the aggregated particles by any method within the purview of those skilled in the art. In embodiments, the resins used to form the shell may be in an emulsion, optionally including any surfactant described herein. The emulsion possessing the resins may be combined with the aggregated particles so that the shell forms over the aggregated particles.

The formation of the shell over the aggregated particles may occur while heating to a temperature from about 30° C. to about 80° C., in embodiments, from about 35° C. to about 70° C. The formation of the shell may take place for a period of time from about 5 minutes to about to hours, in embodiments, from about 10 minutes to about 5 hours.

The shell may be present in an amount from about 1% by weight to about 80% by weight of the toner components, in embodiments, from about 10% by weight to about 40% by weight of the toner components, in embodiments from about 20% by weight to about 35% by weight of the toner components.

c. Coalescence

Following aggregation to a desired particle size and application of any optional shell, the particles then may be coalesced to a desired final shape, such as, a circular shape, for example, to correct for irregularities in shape and size, the coalescence being achieved by, for example, heating the mixture to a temperature from about 45° C. to about 100° C., in embodiments, from about 55° C. to about 99° C., which may be at or above the $T_g$ of the resins used to form the toner particles, and/or reducing the stirring, for example to from about 1000 rpm to about 100 rpm, in embodiments, from about 800 rpm to about 200 rpm. In embodiments, the coalescence temperature is about 75° C.

Coalescence may be conducted over a period from about 0.01 to about 9 hours, in embodiments, from about 0.1 to about 4 hours, see, for example, U.S. Pat. No. 7,736,831. In embodiments, coalescence is conducted over a period of from 1 to about 3 hours.

Optionally, a coalescing agent may be used. Examples of suitable coalescence agents include, but are not limited to, benzoic acid alkyl esters, ester alcohols, glycol/ether-type solvents, long chain aliphatic alcohols, aromatic alcohols, mixtures thereof and the like. Examples of benzoic acid alkyl esters include those where the alkyl group, which may be straight or branched, substituted or unsubstituted, has from about 2 to about 30 carbon atoms, such as, decyl or isodecyl benzoate, nonyl or isononyl benzoate, octyl or isooctyl benzoate, 2-ethylhexyl benzoate, tridecyl or isotridecyl benzoate, 3,7dimethyloctyl benzoate, 3,5,5-trimethylhexyl benzoate, mixtures thereof and the like.

In embodiments, the coalescence agent (or coalescing agent or coalescence aid agent) evaporates during later stages of the emulsion/aggregation process, such as, during a second heating step, that is, generally above the $T_g$ of the resin or a polymer. The final toner particles are thus, free of, or essentially or substantially free of any remaining coalescence agent. To the extent that any remaining coalescence agent may be present in a final toner particle, the amount of remaining coalescence agent is such that presence thereof does not affect any properties or the performance of the toner or developer.

The coalescence agent can be added prior to the coalescence or fusing step in any desired or suitable amount. For example, the coalescence agent may be added in an amount of from about 0.01 to about 10% by weight, based on the solids content in the reaction medium. Of course, amounts outside those ranges can be used, as desired.

In embodiments, the coalescence agent can be added at any time between aggregation and coalescence, although in some embodiments it may be desirable to add the coalescence agent after aggregation is, "frozen," or completed, for example, by adjustment of pH, for example, by addition, for example, of base.

Coalescence may proceed and be accomplished over a period of from about 0.1 to about 9 hours, in embodiments, about 1 to about 3 hours. In embodiments, about 1.3 to about 2.0 hours.

After coalescence, the mixture may be cooled to room temperature, such as, from about 20° C. to about 25° C. The cooling may be rapid or slow, as desired. A suitable cooling method may include introducing cold water in a jacket around the reactor. After cooling, the toner particles optionally may be washed with water and then dried. Drying may be accomplished by any suitable method for drying including, for example, freeze drying.

d. Optional Additives

In embodiments, the toner particles also may contain other optional additives.

i. Charge Additives

The toner may include any known charge additives in amounts of from about 0.1 to about 10 weight %, in embodiments, of from about 0.5 to about 7 weight % of the toner. Examples of such charge additives include alkyl pyridinium halides, bisulfates, the charge control additives of U.S. Pat. Nos. 3,944,493; 4,007,293; 4,079,014; 4,394,430; and 4,560,635, the disclosure of each of which hereby is incorporated by reference in entirety, negative charge enhancing additives, such as, aluminum complexes, and the like.

Charge enhancing molecules can be used to impart either a positive or a negative charge on a toner particle. Examples include quaternary ammonium compounds, see, for example, U.S. Pat. No. 4,298,672, organic sulfate and sulfonate compounds, see for example, U.S. Pat. No. 4,338,390, cetyl pyridinium tetrafluoroborates, distearyl dimethyl ammonium methyl sulfate, aluminum salts and so on.

ii. Surface Modifications

As provided above, toner can comprise various surface modifications to obtain desired properties.

The dry toner particles, exclusive of external surface additives, may have the following characteristics: (1) volume average diameter (also referred to as "volume average particle diameter") of from about 2.5 to about 20 µm, in embodiments, from about 2.75 to about 10 µm, in embodiments, from about 3 to about 7.5 µm; (2) number average geometric standard deviation (GSDn) and/or volume average geometric standard deviation (GSDv) of from about 1.18 to about 1.30, in embodiments, from about 1.21 to about 1.24; and (3) circularity of from about 0.9 to about 1.0 (measured with, for example, a Sysmex FPIA 2100 analyzer), in embodiments, from about 0.95 to about 0.985, in embodiments, from about 0.96 to about 0.98. In embodiments, the circularity may be from about 0.950 to about 0.970, in embodiments, the circularity is about 0.698.

III. Developers

A. Composition

The toner particles thus formed may be formulated into a developer composition. For example, the toner particles may be mixed with carrier particles to achieve a two component developer composition. The toner concentration in the developer may be from about 1% to about 25% by weight of the total weight of the developer, in embodiments, from about 2% to about 15% by weight of the total weight of the developer, with the remainder of the developer composition being the carrier. However, different toner and carrier percentages may be used to achieve a developer composition with desired characteristics.

1. Carrier

Examples of carrier particles for mixing with the toner particles include those particles that are capable of triboelectrically obtaining a charge of polarity opposite to that of the toner particles. Illustrative examples of suitable carrier particles include granular zircon, granular silicon, glass, steel, nickel, ferrites, iron ferrites, silicon dioxide, one or more polymers and the like. Other carriers include those disclosed in U.S. Pat. Nos. 3,847,604; 4,937,166; and 4,935,326.

In embodiments, the carrier particles may include a core with a coating thereover, which may be formed from a polymer or a mixture of polymers that are not in close proximity thereto in the triboelectric series, such as, those as taught herein or as known in the art. The coating may include fluoropolymers, such as polyvinylidene fluorides, terpolymers of styrene, methyl methacrylates, silanes, such as triethoxy silanes, tetrafluoroethylenes, other known coatings and the like. For example, coatings containing polyvinylidenefluoride, available, for example, as KYNAR 301F™, and/or polymethylmethacrylate (PMMA), for example, having a weight average molecular weight of about 300,000 to about 350,000, such as, commercially available from Soken, may be used. In embodiments, PMMA and polyvinylidenefluoride may be mixed in proportions of from about 30 to about 70 weight percent to about 70 to about 30 weight percent, in embodiments, from about 40 to about 60 weight percent to about 60 to about 40 weight percent. The coating may have a coating weight of, for example, from about 0.1 to about 5% by weight of the carrier, in embodiments, from about 0.5 to about 2% by weight of the carrier.

The carrier particles may be prepared by mixing the carrier core with polymer in an amount from about 0.05 to about 10% by weight, in embodiments, from about 0.01 to about 3% by weight, based on the weight of the coated carrier particle, until adherence thereof to the carrier core is obtained, for example, by mechanical impaction and/or electrostatic attraction.

IV. Devices Comprising a Toner Particle

Toners and developers may be combined with a number of devices ranging from enclosures or vessels, such as, a vial, a bottle, a flexible container, such as a bag or a package, and so on, to devices that serve more than a storage function.

A. Imaging Device Components

The toner compositions and developers of interest may be incorporated into devices dedicated, for example, to delivering same for a purpose, such as, forming an image. Hence, particularized toner delivery devices are known, see, for example, U.S. Pat. No. 7,822,370, and may contain a toner preparation or developer of interest. Such devices include cartridges, tanks, reservoirs and the like, and may be replaceable, disposable or reusable. Such a device may comprise a storage portion; a dispensing or delivery portion; and so on; along with various ports or openings to enable toner or developer addition to and removal from the device; an optional portion for monitoring amount of toner or developer in the device; formed or shaped portions to enable siting and seating of the device in, for example, an imaging device; and so on.

B. Toner or Developer Delivery Device

A toner or developer of interest may be included in a device dedicated to delivery thereof, for example, for recharging or refilling toner or developer in an imaging device component, such as, a cartridge, in need of toner or developer, see, for example, U.S. Pat. No. 7,817,944, wherein the imaging device component may be replaceable or reusable.

V. Imaging Devices

The toners or developers may be used for electrostatographic or electrophotographic processes, including those disclosed in U.S. Pat. No. 4,295,990, the disclosure of which hereby is incorporated by reference in entirety. In embodiments, any known type of image development system may be used in an image developing device, including, for example, magnetic brush development, jumping single component development, hybrid scavengeless development (HSD) and the like. Those and similar development systems are within the purview of those skilled in the art.

Color printers commonly use four housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut).

The following Examples illustrate embodiments of the instant disclosure. The Examples are intended to be illustrative only and are not intended to limit the scope of the present disclosure. Parts and percentages are by weight unless otherwise indicated. As used herein, RT refers to a temperature of from about 20° C. to about 30° C.

EXAMPLES

Example 1

Synthesis of Bio-Based Resin

To a 1-L Buchi reactor were added the disproportionated rosin acid, comprised mainly of dehydro-adietic acid (258.3 g), glycerine carbonate (115.9 g) and tetraethylammonium iodide (1.42 g). The mixture was heated to 170° C. and maintained for 9 hours until the acid value was less than 1 mg/g KOH. To that mixture were added ethyl butylene glycol (169.7 g), terephthalic acid (260.85 g), and FASCAT 4100 (1.5 g). The mixture was heated from 165° C. to 220° C. over a 5 hour period and maintained overnight. The mixture then was heated to 225° C. until a softening point of 120.7° C. was obtained.

Example 2

Toner Preparation with Bioresin, 9% Wax and 6.8% Crystalline Polyester Emulsion (CPE)

Into a 2 liter glass reactor equipped with an overhead mixer were added 307.58 g emulsion of bioresin of Example 1 (19.78 wt %) prepared by a standard PIE process (particle size of 120.6 nm), 23.38 g CPE resin emulsion (35.60 wt %), 36.94 g IGI wax dispersion (29.97 wt %) and 48.09 g cyan pigment PB15:3 (14.96 wt %). Separately, 1.11 g $Al_2(SO_4)_3$ (27.85 wt %) were added as flocculent under homogenization. The mixture was heated to 46.4° C. to aggregate the particles while stirring at 300 rpm. The particle size was monitored with a COULTER COUNTER until the core particles reached a volume average particle size of 4.17 μm with a $GSD_v$ of 1.25, and then 169.87 g of above mentioned bioresin emulsion were added as shell material, resulting in core-shell structured particles with an average particle size of 5.65 microns and $GSD_v$ of 1.25. Thereafter, the pH of the reaction slurry was increased to 7.8 using 4 wt % NaOH solution followed by 4.62 g EDTA (39 wt %) to freeze toner growth. After freezing, the reaction mixture was heated to 75° C. and the pH was adjusted to from about 8.9 to about 7.3, such that the coalescence times (e.g., 1 h, 2 h and 3 hr) and noted circularities (e.g., from 0.954-0.968) were achieved.

A lean six σ software analysis was used to optimize coalescence conditions by varying input parameters. For instance, coalescence times of 1 and 3 hours and low circularity (0.948 to 0.953) and high circularity of (0.966 to 0.968) were selected for a 2×2 orthogonal experiments. Thus, the four combinations, experiments were analysed, L-L, L-H, H-L, H-H where the first place relates to the coalescence time, L for low or 1 hour and H for high or 3 hours, and the second place relates to low or high circularity. The center point is a coalescence time of 2 hours and a circularity of 0.963 (midway between the low and high circularity ranges). The six σ Software applies an algorithm for toner performance as to the two parameters to reveal the optimal input conditions to obtain optimal performance.

Observed values for various toners produced as outlined above are shown in Table 1.

TABLE 1

Particle Characteristics of Bio-Based Toners

| Toner ID | Particle Size | GSD (vol/number) | Circularity | Coalescence Time | Cell |
|---|---|---|---|---|---|
| 1 | 6.21 | 1.23/1.25 | 0.966 | 3 H | H-H |
| 2 | 6.08 | 1.24/1.24 | 0.953 | 3 H | L-H |
| 3 | 5.90 | 1.25/1.28 | 0.968 | 1 H | H-L |
| 4 | 6.15 | 1.23/1.24 | 0.948 | 1 H | L-L |
| 5 | 5.77 | 1.21/1.23 | 0.963 | 2 H | C |
| 6 | 6.15 | 1.23/1.24 | 0.960 | 1 H | Used for Washing Study |

H-H, higher-end circularity, 3 hr coalescence; L-H, lower-end circularity, 3 hr coalescence; H-L, higher-end circularity, 1 hr coalescence; L-L, lower-end circularity, 1 hr coalescence; C, center-point circularity, 2 hr coalescence.

Example 3

Fusing Results

Unfused images were generated using a modified DC12 copier. A TMA (Toner Mass per unit Area) of 1.00 mg/cm$^2$ was used for the amount of toner placed on Color Xpressions Select (CXS, 90 gsm, uncoated, P/N 3R11540) paper and used for gloss, crease and hot offset measurements. Gloss/crease targets were a square image placed in the center of the page. In general, two passes through the DC12, while adjusting developer bias voltage, were required to achieve the desired TMA. Samples were fused with a XEROX Fusing Fixture. Some of the data relating to the fusing studies are provided in Table 2.

TABLE 2

Fusing Properties of Bio-based Toners.

| | LMW/HMW Toner | 1 H-H | 2 L-H | 3 H-L | 4 L-H | 5 C |
|---|---|---|---|---|---|---|
| Cold Offset on CXS (° C.) | 120/117 | 123 | 123 | 123 | 123 | 123 |
| Peak Gloss on CXS (° C.) | 69.9/52.2 | 59.7 | 60.2 | 60.1 | 58.1 | 58.8 |
| T(Gloss 50) on CXS (° C.) | 125/172 | 148 | 149 | 143 | 136 | 136 |
| MFT$_{CA=80}$ (Extrapolated) | 113/118 | 130 | 130 | 128 | 124 | 124 |

TABLE 2-continued

Fusing Properties of Bio-based Toners.

| Toner | LMW/HMW | 1 H-H | 2 L-H | 3 H-L | 4 L-H | 5 C |
|---|---|---|---|---|---|---|
| MFT (° C.) Mottle/Hot Offset CXS at 220 mm/s (° C.) | 165/210 | 190/200 | 190/205 | 185/195 | 155/160 | 160/165 |

Control toners were composed of a low molecular weight (LMW) or high molecular weight (HMW) amorphous resin.

Example 4

Electrical Results

A. Parent Charging.

Charging was done utilizing commercially available additives in amounts found in a commercial product.

Compared to control, all of the cells exhibited good parent charge, for example, biotoners showed benchmark charge in A-zone and J-zone as compared to a commercially available emulsion aggregation biotoner available from Fuji Xerox.

B. Additive Charging.

All biotoner samples showed charge comparable to that of the control.

C. RH Ratio

All biotoner samples exhibited comparable RH ratios as compared to control.

Example 5

Blocking

The biotoner samples were similar to control.

Example 6

Performance

Overall performance data for samples for particular parameters may be seen in Table 3.

TABLE 3

Performance Data for Bio-Based Resins.

| Factor | Optimum Fusing | Overall Optimum Fusing and Charging | Range | Xerox 700 Toner Control | LMW Control 85° C. | HMW Control 85° C. |
|---|---|---|---|---|---|---|
| Circularity | 0.968 | 0.968 | 0.953-0.968 | | | |
| Coalescence Time | 1 | 1.38 | 1-3 hrs | | | |
| COT | 124 | 124 | 123-127 | | 120 | 117 |
| Peak Gloss | 59.6 | 59.6 | 58.1-60.9 | | 69.9 | 52.2 |
| Tgloss = 50 | 140.0 | 136.5 | 136-149 | | 120 | 153 |
| MFT | 127.0 | 124.8 | 124-130 | | 113 | 118 |
| Mottle T | 185.3 | 172.1 | 155-190 | | 165 | 210 |
| HOT T | 193.0 | 177.9 | 160-205 | | 165 | 210 |
| A zone Parent QD | 3.7 | 7.0 | 6.2-10 | 8.2 | | |
| A zone Parent QM | 23.3 | 33.5 | 29-41 | 46 | | |
| J zone Parent QD | 17.2 | 16.2 | 15.7-17.9 | 23.6 | | |
| J zone Parent QM | 93.7 | 85.8 | 78-88 | 128 | | |
| RH QD | 0.21 | 0.44 | 0.3-0.64 | 0.35 | | |
| RH QM | 0.24 | 0.40 | 0.33-0.53 | 0.36 | | |
| A 10' QD | 8.2 | 8.5 | 6.4-8.2 | 6.6 | | |
| A 10' QM | 43.0 | 44.2 | 38-45 | 41 | | |
| J 10' QD | 15.2 | 16.8 | 14.9-17.7 | 12 | | |
| J 10' QM | 81.2 | 81.2 | 77-88 | 64 | | |
| RH 10' QD | 0.47 | 0.47 | 0.43-0.51 | 0.55 | | |
| RH 10' QM | 0.50 | 0.52 | 0.48-0.53 | 0.64 | | |
| A Add QD | 5.8 | 5.6 | 4.2-5.4 | 5.2 | | |
| A Add QM | 30.3 | 29.6 | 26.5-32 | 28 | | |
| J Add QD | 13.2 | 14.5 | 12.5-15.3 | 10.5 | | |
| J Add QM | 71.5 | 76.0 | 61-78 | 55 | | |
| RH Add QD | 0.43 | 0.40 | 0.31-0.39 | 0.49 | | |
| RH Add QM | 0.42 | 0.41 | 0.37-0.46 | 0.51 | | |

Optimum performance was exhibited at a circularity of 0.968 and a coalescence time of 1.38 hrs. Overall, the thermal properties, bench test fusing, blocking and electrical performance of the bio-based toners of interest are similar or improved as compared to the commercial bio-based toner and non-bio-based resin toner controls.

It will be appreciated that several of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in their entireties.

We claim:

1. Sustainable toner particles comprising a polyester polymer comprising a reaction product of a rosin diol, 2-ethyl-2-butyl 1,3 propanediol and terephthalic acid, wherein the rosin diol is a reaction product of a rosin acid and a cyclic alkylene carbonate.

2. The sustainable toner particles of claim 1, comprising a circularity of from about 0.96 to about 0.97.

3. The sustainable toner particles of claim 1, comprising a shell.

4. A developer comprising the sustainable toner of claim 1.

5. The developer of claim 4 comprising a carrier.

6. The toner particles of claim 1 comprising a biocontent of from about 45% to about 75% by weight of the polyester polymer.

7. The toner particles of claim 1 comprising a biocontent of at least about 70% by weight of the polyester polymer.

8. The toner particles of claim 1 further comprising an amorphous resin, a crystalline resin, a colorant, a wax or combinations thereof.

9. The sustainable toner particles of claim 1, comprising a circularity of from about 0.95 to about 0.985.

\* \* \* \* \*